United States Patent
Choi et al.

(10) Patent No.: US 12,010,522 B2
(45) Date of Patent: Jun. 11, 2024

(54) METHOD AND APPARATUS FOR CONTROLLING SPATIAL REUSE IN WIRELESS LAN SYSTEM

(71) Applicant: Samsung Electronics Co., Ltd., Suwon-si (KR)

(72) Inventors: Junsu Choi, Suwon-si (KR); Hyunkee Min, Suwon-si (KR); Sunkee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 17/284,955

(22) PCT Filed: Sep. 30, 2019

(86) PCT No.: PCT/KR2019/012762
§ 371 (c)(1),
(2) Date: Apr. 13, 2021

(87) PCT Pub. No.: WO2020/080703
PCT Pub. Date: Apr. 23, 2020

(65) Prior Publication Data
US 2021/0360419 A1   Nov. 18, 2021

(30) Foreign Application Priority Data
Oct. 16, 2018  (KR) ......................... 10-2018-0123364

(51) Int. Cl.
*H04W 16/14*  (2009.01)
*H04W 84/12*  (2009.01)

(52) U.S. Cl.
CPC ............ *H04W 16/14* (2013.01); *H04W 84/12* (2013.01)

(58) Field of Classification Search
CPC .............................. H04W 16/14; H04W 84/12
See application file for complete search history.

(56) References Cited

U.S. PATENT DOCUMENTS

| | | | |
|---|---|---|---|
| 2011/0237244 A1* | 9/2011 | Hiltunen | H04W 52/244 455/423 |
| 2012/0028630 A1* | 2/2012 | Yamamoto | H04W 52/242 455/422.1 |

(Continued)

FOREIGN PATENT DOCUMENTS

KR    10-2018-0012258 A    2/2018

OTHER PUBLICATIONS

Korean Office Action dated Dec. 14, 2023, issued in Korean Patent Application No. 10 2018 0123364.

*Primary Examiner* — Zhiren Qin
(74) *Attorney, Agent, or Firm* — Jefferson IP Law, LLP

(57) ABSTRACT

Various embodiments of the present invention disclose a spatial reuse method and apparatus in a wireless local area network (WLAN) system. According to various embodiments of the present invention, an electronic device comprises a communication circuit for wireless communication with at least one external device and a processor operatively connected to the communication circuit, wherein the processor may determine an allowable interference level for spatial reuse in association with an adjacent basic service set (BSS) in a network environment where a plurality of electronic devices operate, determine a configuration to be used during uplink transmission by at least one mobile device connected to the electronic device on the basis of the adjacent BBS allowing the determined interference level, and transmit a trigger frame including the determined configuration to the mobile device by using the communication circuit. Various embodiments are possible.

14 Claims, 13 Drawing Sheets

(56) References Cited

U.S. PATENT DOCUMENTS

| | | | |
|---|---|---|---|
| 2012/0287886 A1* | 11/2012 | Fukuoka | H04L 1/1893 370/329 |
| 2014/0003288 A1* | 1/2014 | Pan | H04W 24/02 370/254 |
| 2014/0226504 A1* | 8/2014 | Tavildar | H04W 36/20 370/252 |
| 2016/0066257 A1 | 3/2016 | Liu et al. | |
| 2016/0081042 A1* | 3/2016 | Choudhury | H04W 24/02 370/252 |
| 2016/0174079 A1 | 6/2016 | Wang et al. | |
| 2017/0070962 A1 | 3/2017 | Wang et al. | |
| 2017/0230837 A1 | 8/2017 | Huang et al. | |
| 2017/0325178 A1 | 11/2017 | Verma et al. | |
| 2018/0139635 A1 | 5/2018 | Oteri et al. | |
| 2018/0159654 A1 | 6/2018 | Huang et al. | |
| 2018/0227952 A1 | 8/2018 | Kim et al. | |
| 2020/0076519 A1* | 3/2020 | Asterjadhi | H04L 1/0027 |
| 2020/0077273 A1* | 3/2020 | Cherian | H04W 16/14 |
| 2020/0106579 A1* | 4/2020 | Cherian | H04W 52/38 |

* cited by examiner

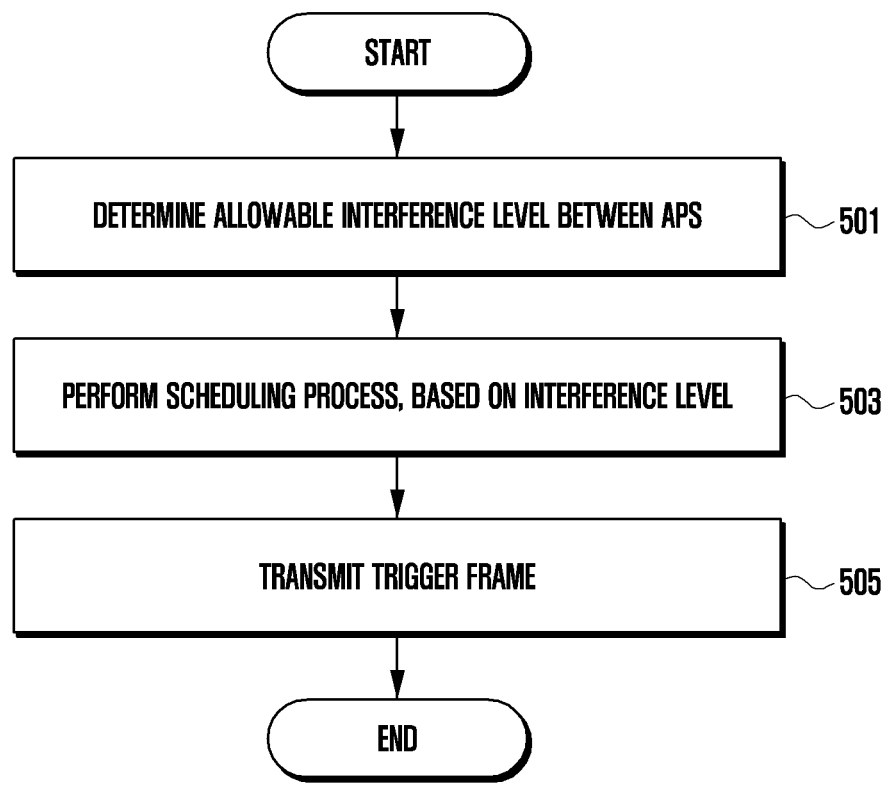

METHOD AND APPARATUS FOR CONTROLLING SPATIAL REUSE IN WIRELESS LAN SYSTEM

TECHNICAL FIELD

Various embodiments relate to a spatial reuse method and apparatus in a Wireless Local Area Network (WLAN) system.

BACKGROUND ART

In order to process data traffic due to a recent rapid increase in mobile devices such as smart phones, research on a next-generation wireless communication system is actively in progress. A mobile device mainly used by a user, such as a smart phone, may include a cellular mobile communication system using a base station network provided by each mobile carrier and a Wireless Local Area Network (WLAN) system providing a short-range communication system using bands of about 2.4 GHz and about 5 GHz that are unlicensed bands.

An environment in which a recent WLAN system is used may be a high-density environment in which a plurality of users (or terminals) and a WLAN coexist, like an indoor high user-density facility, such as an airport, a railway station, or a department store, or an outdoor high user-density area, such as a playground or downtown. The conventional WLAN system based on Institute of Electrical and Electronics Engineers (IEEE) 802.11 was not designed in consideration of such a high density environment, and thus it may be difficult to provide high quality of transmission to users.

DISCLOSURE OF INVENTION

Technical Problem

In a WLAN system of IEEE 802.11, one terminal or Access Point (AP) (hereinafter, referred to as an AP) occupies a radio medium (for example, a radio channel) and thus all terminals and APs capable of detecting transmission of the corresponding frame cannot access the radio medium when transmitting the frame. Accordingly, the frame being transmitted may be protected from interference through first occupancy of the radio medium in the distributed radio medium access control of the WLAN system of IEEE 802.11.

In a WLAN system of IEEE 802.11ax, when the frame is being transmitted through occupancy of the radio medium, an adjacent AP or a terminal accessing the AP to operate may ignore the frame being transmitted and support spatial reuse through which the radio medium can be re-occupied, unlike the conventional WLAN system of IEEE 802.11. In this case, due to the spatial reuse, interference may be generated between a link which first occupies and uses a radio medium and a link which ignores the first occupancy and reoccupies the radio medium. Accordingly, when interference is not appropriately controlled, frame transmission of the link which first occupies the radio medium may fail due to the interference, and thus a communication capacity of the total network may be reduced by the spatial reuse.

Various embodiments disclose a method and apparatus for controlling spatial reuse for improving a communication capacity of the total network by increasing efficiency of the spatial reuse in a WLAN system.

Various embodiments disclose a method and an apparatus for controlling spatial reuse to efficiently perform the spatial reuse between electronic devices in a WLAN system in which a plurality of electronic devices (for example, Access Points (APs)) operate.

Solution to Problem

An electronic device according to various embodiments of the disclosure may include: a communication circuit for wireless communication with at least one external device; and a processor, wherein the processor is configured to determine an allowable interference level for spatial reuse in connection with an adjacent Basic Service Set (BSS) in a network environment in which a plurality of electronic devices operate, determine a configuration to be used in uplink transmission by at least one mobile device connected to the electronic device, based on an allowance of the determined interference level by the adjacent BSS, and transmit a trigger frame including the determined configuration.

A method of operating an electronic device according to various embodiments of the disclosure may include: determining an allowable interference level for spatial reuse in connection with an adjacent Basic Service Set (BSS) in a network environment in which a plurality of electronic devices operate; determining a configuration to be used for uplink transmission by at least one mobile device connected to the electronic device on the basis of allowance of the determined interference level by the adjacent BSS; and transmitting a trigger frame including the determined configuration.

In order to solve the problem, various embodiments of the disclosure may include a computer-readable recording medium which records a program for performing the method by a processor.

Advantageous Effects of Invention

An electronic device and a method of operating the same according to various embodiments can increase efficiency of spatial reuse between electronic devices in a Wireless Local Area Network (WLAN) system in which a plurality of electronic devices (for example, Access Points (APs)) operate.

According to various embodiments, in the WLAN system, it is possible to efficiently perform spatial reuse while making reception of the frame transmitted through first occupancy of a radio medium not influenced by interference generated by the spatial reuse.

According to various embodiments, it is possible to further improve a communication capacity in an aspect of the total network and more fully satisfy needs of (for example, quality of service requirements) users in a network environment in which spatial reuse is efficiently performed and thus a plurality of electronic devices operate together.

BRIEF DESCRIPTION OF DRAWINGS

FIG. 5 is a flowchart illustrating a method of operating an electronic device according to various embodiments;

MODE FOR CARRYING OUT THE INVENTION

Figure 1:
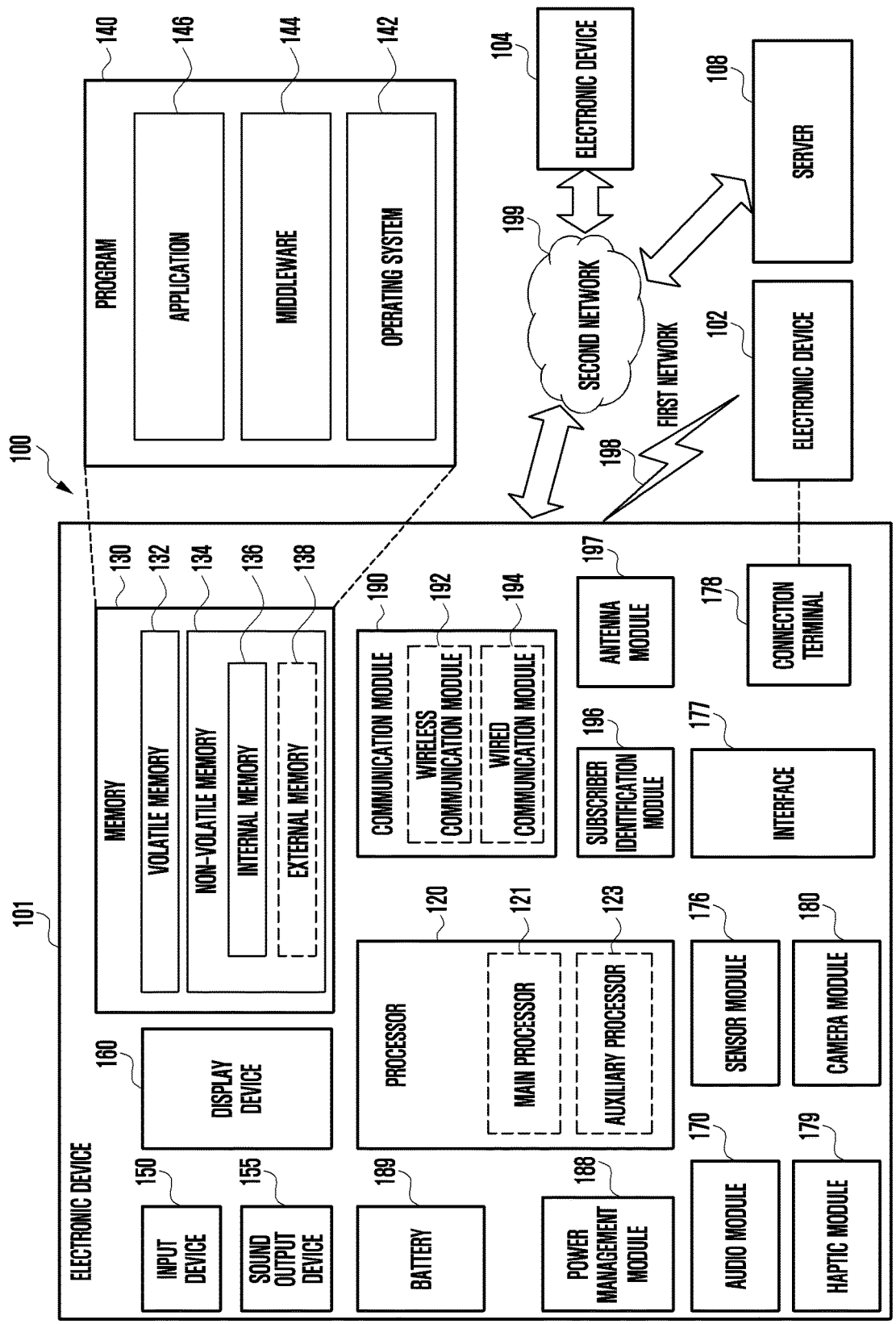
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
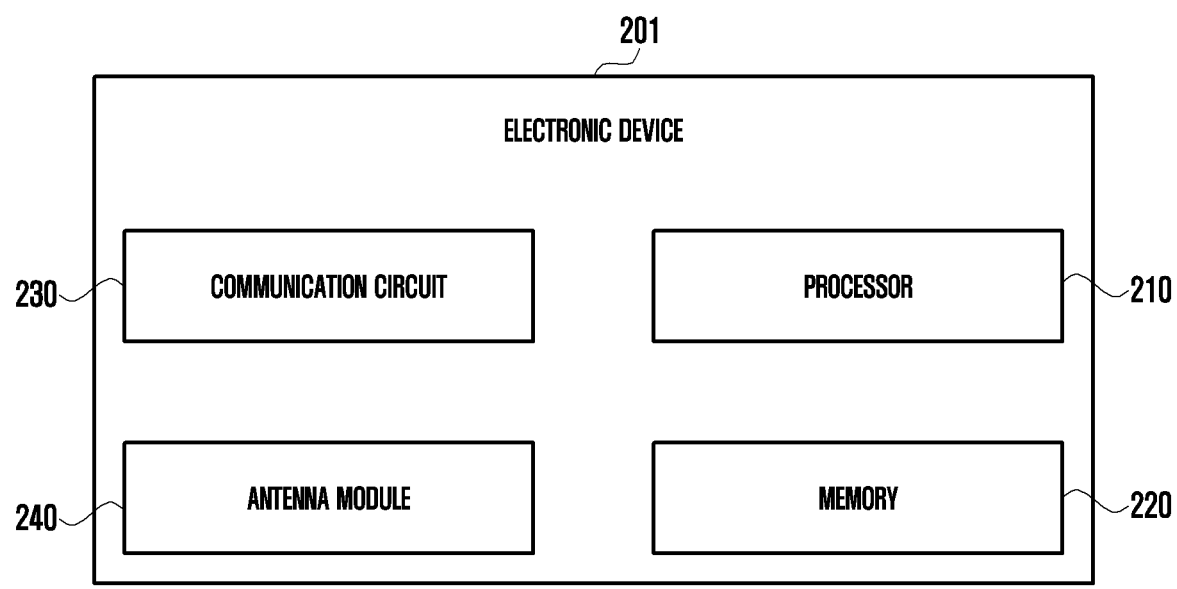
FIG. 2 is a block diagram schematically illustrating another electronic device according to various embodiments.

FIG. 2 is a block diagram schematically illustrating another electronic device 201 according to various embodiments.

For example, FIG. 2 is a block diagram illustrating the electronic device 201 (for example, an Access Point (AP)) (hereinafter, referred to as an "AP") for increasing a spatial reuse rate according to various embodiments. FIG. 2 schematically illustrates the AP 201, but the AP 201 may include some or all of the elements of the electronic device 101 illustrated in FIG. 1. For example, the AP 201 may be a device which is the same type as or a different type from the electronic device 101 illustrated in FIG. 1.

Referring to FIG. 2, the AP 201 may include a processor 210, a memory 220, a communication circuit 230, and an antenna module 240.

According to various embodiments, all or some of the operations of the processor 210, the memory 220, the communication circuit 230, and the antenna module 240 of the AP 201 may correspond to the operations of the elements (for example, the processor 120 of FIG. 1, the memory 130 of FIG. 1, the communication module 190 of FIG. 1, and the antenna module 197 of FIG. 1) of the electronic device 101 in FIG. 1.

According to an embodiment, the processor 210 may control, for example, at least one other element (for example, a hardware or software element) of the AP 201 connected to the processor 210 by executing software, and perform various data processing or calculations. According to an embodiment, as at least a portion of data processing or calculations, the processor 210 may load commands or data received from another element (for example, the communication circuit 230) to the memory 220, process the commands or data stored in the memory 220, and store resultant data. According to an embodiment, the processor 210 may process a spatial reuse control procedure of various embodiments.

According to an embodiment, the memory 220 may store various pieces of data used by at least one element (for example, the processor 210) of the AP 201. The data may include, for example, software (for example, the program 140 of FIG. 1) and input data or output data of commands related thereto. The memory 220 may include volatile memory or non-volatile memory. According to an embodiment, the memory 220 may store a module (for example, a process or a function) for performing a function according to various embodiments, and the modules stored in the memory 220 may be executed by the processor 210.

According to an embodiment, the communication circuit 230 may establish a wireless communication channel between the AP 201 and an external electronic device (for example, the electronic device 101) and perform wireless communication through the established communication channel. The communication circuit 230 may identify and authenticate the electronic device 101 within a communication network.

According to an embodiment, the antenna module 240 may transmit a signal or power to the outside (for example, the electronic device 101) or receive the same from the outside. According to an embodiment, the antenna module 240 may include one antenna including a conductor configured on a substrate (for example, a PCB) or a radiator configured in a conductive pattern. According to an embodiment, the antenna module 240 may include a plurality of antennas.

Figure 3:
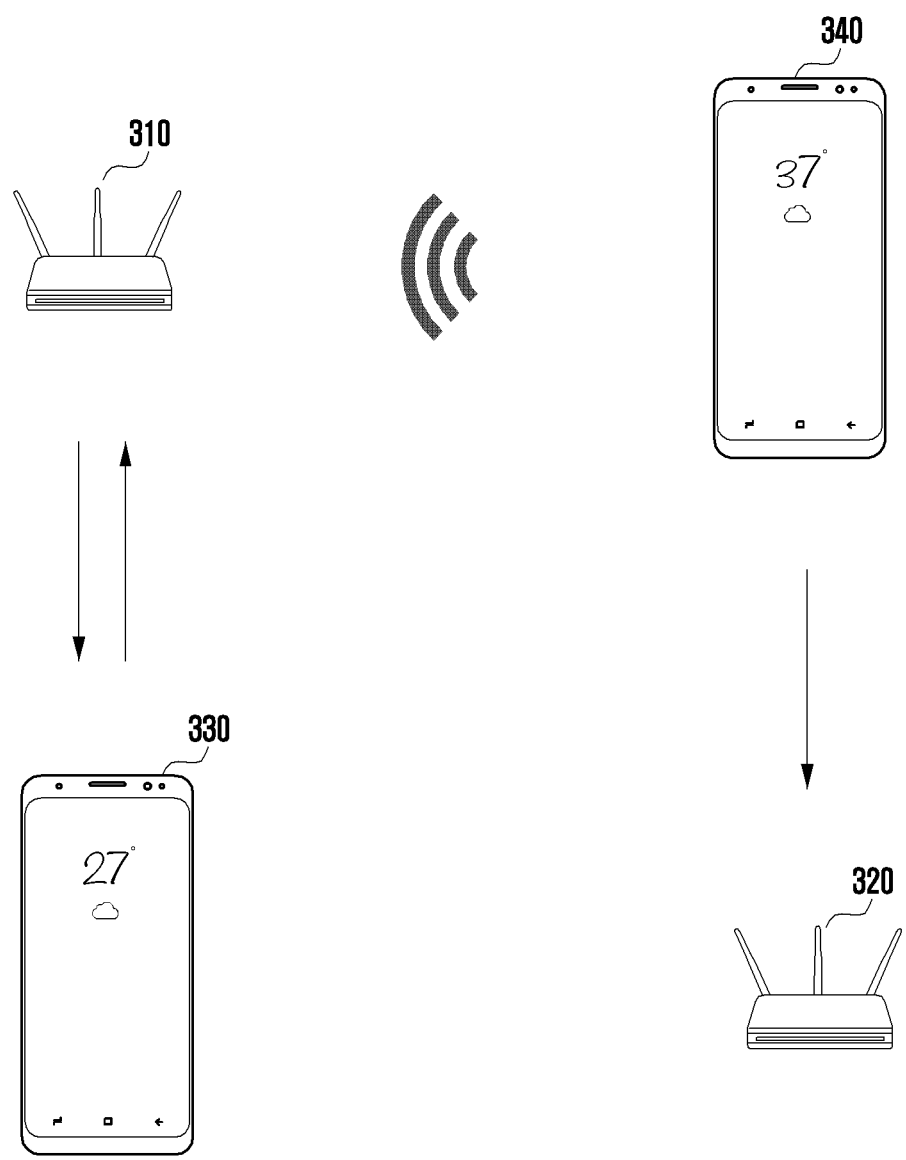
FIG. 3 is a diagram illustrating an example of controlling interference when spatial reuse is performed in a wireless LAN system according to various embodiments.

FIG. 3 is a diagram illustrating an example of controlling interference when spatial reuse is performed in a WLAN system according to various embodiments.

A spatial reuse control method according to various embodiments may be applied to various wireless communication systems, and a Wireless Local Area Network (WLAN) system is described hereinafter in an embodiment as an example of a system to which various embodiments of the disclosure are applied, but various embodiments are not limited thereto.

According to various embodiments, FIG. 3 illustrates an example of controlling interference by power back-off in a WLAN system.

As illustrated in FIG. 3, a system (or a network environment) according to various embodiments may include a base station which helps the connection of at least one wireless device to the network, a wireless hub, or electronic devices (for example, electronic devices 310 and 320) of a first type serving as a relay device, and electronic devices 330 and 340 of a second type accessing the electronic devices 310 and 320 of the first type and using a service (for example, an Internet service) through the corresponding accessed electronic devices 310 and 320 of the first type.

According to various embodiments, the electronic devices 310 and 320 of the first type may widely refer to, for example, devices serving as a base station for at least one other electronic device located within a communication radius configured (or designated) in a WLAL system. According to an embodiment, the electronic devices 310 and 320 of the first type may include the AP or the electronic devices 330 and 340 of the second type described below.

According to various embodiments, the electronic devices 330 and 340 of the second type may widely refer to devices capable of communicating through short-range wireless communication. According to an embodiment, the electronic devices 330 and 340 of the second type may include various mobile devices or portable devices such as a cellular phone, a smart phone, a tablet Personal Computer (PC), or a notebook.

Hereinafter, in description of various embodiments, the electronic devices 310 and 320 of the first type are referred to as "APs" and the electronic devices 330 and 340 of the second type are referred to as "mobile devices" or "terminals".

According to various embodiments, each of the APs 310 and 320 and the mobile devices 330 and 340 may include a communication circuit (for example, the wireless communication module 192 of FIG. 1 or the communication circuit 230 of FIG. 2) which can support wireless communication. According to an embodiment, in FIG. 3, a first mobile device 330 may access a first AP 310, and a second mobile device 340 is accessing a second AP 320.

In order to handle the interference problem in the WLAN system, a trigger frame may be transmitted to an adjacent Basic Service Set (BSS) (for example, an adjacent AP (for example, the second AP 320 or a mobile device (for example, the second mobile device 340) accessing an adjacent AP to operate) for uplink (UL) transmission scheduling of a mobile device (for example, the first mobile device 330) which an AP (for example, the first AP 310) accesses. According to an embodiment, a power backoff condition required when uplink transmission which is a response to the trigger frame is ignored may be specified in the trigger frame. According to an embodiment, in the WLAN system, when the power backoff condition is properly configured, interference between a link which pre-occupies and uses a radio medium (for example, a radio channel) and a link which re-occupies and uses a radio medium can be controlled, and accordingly, efficient spatial reuse is possible.

An example of supporting a spatial reuse protocol according to various embodiments is described with reference to FIG. 3. According to an embodiment, FIG. 3 illustrates an example of supporting a spatial reuse protocol with reference to the first AP 310.

Referring to FIG. 3, when performing uplink transmission scheduling of the accessed first mobile device 330, the first AP 310 may determine an allowable level or range (hereinafter, referred to as an "interference level") of interference required for normal reception of the corresponding uplink transmission. Thereafter, when transmitting the trigger frame, the first AP 310 may configure a power backoff value of the trigger frame such that interference generated by spatial reuse of an adjacent BSS (for example, the second AP 320 or the second mobile device 340 which accesses the second AP 320 to operate) is within a range of the allowable interference level calculated in the previous step. According to an embodiment, the second AP 320 or the second mobile device 340 which accesses the second AP 320 to operate may configure transmission power on the basis of the power backoff value specified (or configured) in the trigger frame and perform wireless communication on the basis of the configured transmission power. Such a spatial reuse control operation is described below.

According to an embodiment, the first AP 310 may perform a user scheduling process. According to an embodiment, as the scheduling process, the first AP 310 may select, for example, mobile devices (for example, the first mobile device 330) to perform uplink transmission and determine information (or configuration) (hereinafter, referred to as "uplink transmission information") on uplink transmission indicating frequency resources (for example, a bandwidth) in which the selected mobile devices (for example, the first mobile device 330) will transmit spatial streams, the number of spatial streams which the mobile devices will transmit, and a Modulation and Coding Scheme (MCS) through which the mobile devices will transmit the spatial streams.

According to an embodiment, the first AP 310 may estimate a degree of interference allowable by uplink transmission to be transmitted on the basis of the determined information. For example, the first AP 310 may determine an allowable interference level on the basis of the determined information. According to an embodiment, the first AP 310 may specify uplink transmission information of scheduled mobile devices (for example, the first mobile device 330) and a power backoff condition required when an adjacent BSS (for example, the second AP 320 or the second mobile device 340) re-occupies a radio medium in the trigger frame transmitted to induce uplink transmission to the scheduled mobile devices (for example, the first mobile device 330). According to an embodiment, the BSS may mean all of at least one AP and/or all devices (or stations) which can access at least one AP.

According to an embodiment, in an example of performing spatial reuse and power backoff in the adjacent BSS, a power backoff condition specified in the trigger frame may be configured for the estimated allowable interference level as shown in [Equation 1] below.

$$\text{Power backoff configuration-related value} = \text{Trigger frame transmission power} + \text{Allowable interference level.} \quad \text{Equation 1}$$

According to an embodiment, when the AP (for example, the second AP 320) of the adjacent BSS receiving the trigger frame or the mobile device (for example, the second mobile device 340) accessing the corresponding AP (for example, the second AP 320) to operate re-occupies a radio medium through spatial reuse, it is possible to limit interference which is generated by spatial reuse by configuring transmission power such that the power backoff condition is satisfied as shown in [Equation 2] below. For example, when the first AP 310 calculates an interference level allowable for the corresponding uplink during uplink scheduling, a power backoff value may be configured such that interference generated by spatial reuse of the adjacent BSS is within the corresponding range. According to an embodiment, the first AP 310 may configure a power backoff-related configuration value (for example, a spatial reuse parameter) when the trigger frame is transmitted. According to an embodiment, the adjacent BSS may limit transmission power (for example, adjacent BSS transmission power) to be used for spatial reuse with respect to the power backoff-related configuration value (for example, the spatial reuse parameter) and the strength of a signal for receiving the trigger frame as shown in [Equation 2] below.

$$\text{Spatial reuse transmission power} \leq \text{Power backoff configuration-related value} - \text{Trigger frame reception strength} \quad \text{Equation 2}$$

In [Equation 2], the trigger frame reception strength for the trigger frame received by the adjacent BSS (for example, the second AP 320 or the second mobile device 340 accessing the second AP 320 to operate) may be defined with respect to transmission power for transmission of the trigger frame by the first AP 310 and attenuation of the signal with the adjacent BSS therefrom as shown in [Equation 3] below.

$$\text{Trigger frame reception strength} = \text{Trigger frame transmission power} - \text{Signal attenuation} \quad \text{Equation 3}$$

According to an embodiment, equations such as [Equation 4] and [Equation 5] below may be acquired by applying [Equation 3] to [Equation 2].

$$\text{Spatial reuse transmission power} \leq \text{Power backoff configuration-related value} - (\text{Trigger frame transmission power} - \text{Signal attenuation}) \quad \text{Equation 4}$$

$$\text{Spatial reuse transmission power} - \text{Signal attenuation} \leq \text{Power backoff configuration-related value} - \text{Trigger frame transmission power} \quad \text{Equation 5}$$

According to an embodiment, in the final equation of [Equation 5], the left side may denote reception signal strength when the AP (for example, the second AP 320) receives a frame transmitted by the adjacent BSS through spatial reuse, that is, interference generated by the spatial reuse, which may be limited by the right side of the final equation. According to an embodiment, the right side of the final equation corresponds to the power backoff-related configuration value (or the spatial reuse parameter) and power of the trigger power transmitted by the AP (for example, the first AP 310), and thus may be randomly controlled by the AP (for example, the first AP 310). For example, when the allowable interference level is determined in the above-described step, the first AP 310 may configure the power backoff-related configuration value (or the spatial reuse parameter) such that the right side of the final equation in [Equation 5] becomes the allowable interference level of the corresponding interference when the trigger frame is transmitted, so as to make the interference generated by spatial reuse in the left side be within the allowable interference level range.

According to various embodiments, when transmitting the trigger frame in order to perform uplink transmission scheduling in the WLAN system, the AP (for example, the first AP 310) may configure the power backoff value (or the spatial reuse parameter) to be used for spatial reuse by the adjacent BSS (for example, the second AP 320 or the second mobile device 340 accessing the second AP 320 to operate). Accordingly, in various embodiments, it is possible to guarantee that reception of the frame transmitted through first occupancy of the radio medium is not influenced by interference generated by spatial reuse and the spatial reuse is efficiently performed. Therefore, a total communication capacity of the network can be improved in a network environment in which a plurality of APs operate together.

As described above, according to an embodiment, when the AP transmits the trigger frame, the allowable interference level by which reception of the frame is not influenced may be determined on the basis of at least one piece of information configured for each scheduled mobile device. According to an embodiment at least one piece of information may include information such as an MCS, frequency resources (for example, bandwidth), the number of spatial streams, or a target Received Signal Strength Indicator (RSSI). According to an embodiment, when the AP transmits the trigger frame, the AP may configure the power backoff value (or the spatial reuse parameter) to transmit the trigger frame such that interference generated by the spatial reuse of the adjacent BSS is included within the range of the determined interference level. According to an embodiment, the mobile device (for example, the second mobile device 340) receiving the trigger frame may configure transmission power on the basis of the power backoff value specified (configured) in the trigger frame and perform wireless communication on the basis of the configured transmission power.

As described above, in the spatial reuse, the AP may select mobile devices to perform uplink transmission and determine a configuration to be used for uplink transmission by the corresponding mobile devices, and then estimate an interference level allowable for the corresponding uplink transmission. In such an environment, the configuration for the uplink transmission determined by the AP (for example, the first AP 310) cannot allow interference or the allowable interference level may be very small according to an embodiment. In this case, the adjacent BSS may not perform spatial reuse.

According to various embodiments, it is possible to increase the efficiency of spatial reuse by making a request for accepting more interference to the adjacent BSS (or adjacent AP) in order to more rapidly solve traffic congestion through spatial reuse. According to an embodiment, a scheduling process for determining a configuration (for example, uplink transmission information) to be used for uplink transmission may be performed to determine how much interference is accepted for efficient spatial reuse between APs (for example, the first AP 310 and the second AP 320) (for example, determine an interference level) and allow the AP to allow the determined interference level (or in consideration of allowance of the determined interference level by the AP). According to an embodiment, the interference level may be determined on the basis of at least the signal strength between APs (for example, the first AP 310 or the second AP 320) or an amount of traffic and refer to an index indicating how much interference is allowed for the adjacent BSS. Therefore, according to various embodiments, through efficient spatial reuse, the communication capacity may be improved in an aspect of the total network or quality of service requirements of users may be satisfied.

Hereinafter, detailed operations for managing (or controlling) spatial reuse according to various embodiments are described with reference to the accompanying drawings.

Figure 4A:
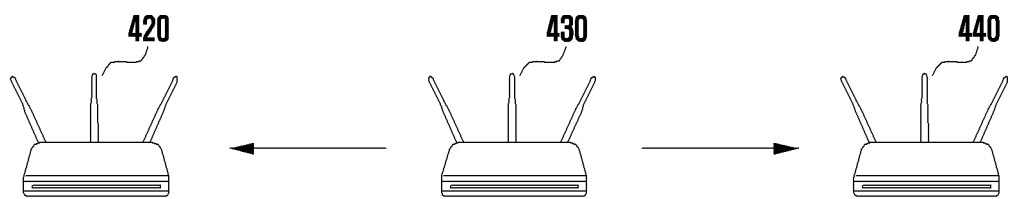
FIGS. 4A and 4B illustrate examples of a system for managing spatial reuse according to various embodiments.
Figure 4B:
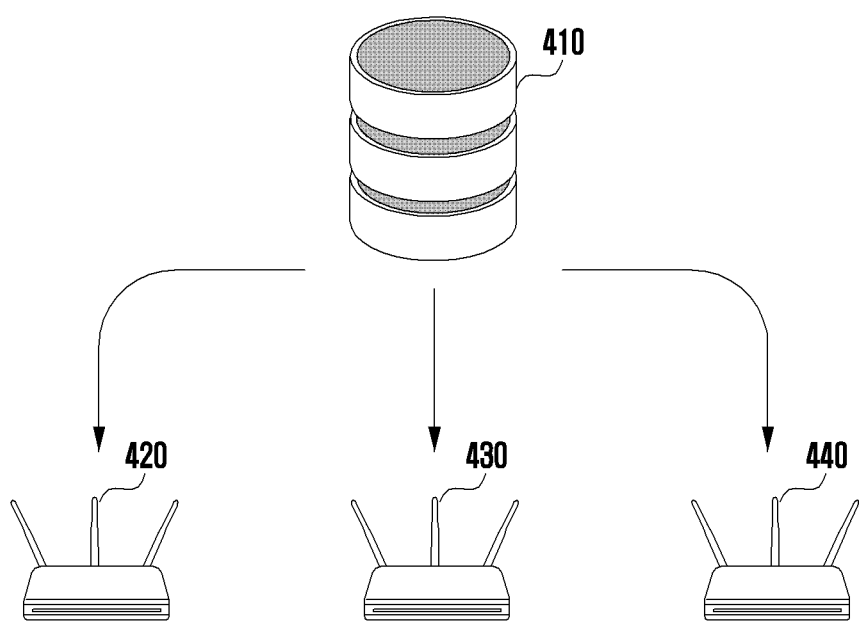

FIGS. 4A and 4B illustrate examples of a system for managing spatial reuse according to various embodiments.

As illustrated in FIGS. 4A and 4B, FIG. 4A illustrates an example in which an allowable interference level between APs 420, 430, or 440 is configured, and FIG. 4B illustrates an example in which a network controller 410 configures and transmits an allowable interference level between adjacent BSSs to each AP 420, 430, or 440.

Referring to FIG. 4A, a first AP 430 may determine how much interference should be accepted therebetween in consideration of the strength of a signal from an adjacent AP (for example, the second AP 420 or the third AP 440) or an amount of traffic. For example, in a network environment in which a plurality of APs 420, 430, and 440 operate, when a large amount of traffic is generated in a BSS to which a specific AP (for example, the first AP 430) belongs, spatial reuse is possible by making a request for accepting more interference in adjacent APs (for example, the second AP 420 and the third AP 440. According to various embodiments, it is possible to improve a communication capacity in an aspect of the total network and meet needs for quality of service requirements of users by determining an interference level for spatial reuse on the basis of a network condition.

According to various embodiments, a step of configuring an interference level between APs 420, 430, and 440 may be performed on the basis of signaling between the APs 420, 430, and 440 as illustrated in, for example, FIG. 4A. For example, signaling between the APs 420, 430, and 440 may be performed through a backhaul network, or wirelessly performed using a vendor-specific action or vendor-specific information element.

According to various embodiments, the step of configuring the interference level between APs 420, 430, and 440 may be controlled by the network controller 410 as illustrated in, for example, FIG. 4B.

Referring to FIG. 4B, in the case of a network environment including the network controller 410 such as an enterprise network, the network controller 410 may dynamically determine how much interference is accepted for the adjacent BSS by the respective APs 420, 430, and 440 included in the network in consideration of a traffic condition in the total network and the signal strength between the APs 420, 430, and 440. According to an embodiment, the network controller 410 may provide the determined interference level to the APs 420, 430, and 440 and thus allow the APs 420, 430, and 440 to configure the interference level. According to an embodiment, the BSS may be at least one AP and/or all devices (or stations) which can access at least one AP.

The electronic device 201 (for example, the first AP 310 or 430 of FIG. 3 or FIG. 4A or the network controller 410 of FIG. 4B) may include a communication circuit (for example, the communication circuit 230 of FIG. 2) and a processor (for example, the processor 210 of FIG. 2) operatively connected to the communication circuit 230, wherein the processor 210 may be configured to determine an allowable interference level for spatial reuse in connection with an adjacent Basic Service Set (BSS) in a network environment in which a plurality of electronic devices operate, determine a configuration to be used in uplink transmission by at least one mobile device connected to the electronic device 201 on the basis of allowance of the determined interference level by the adjacent BSS, and transmit a trigger frame including the determined configuration to the mobile device through the communication circuit 230.

According to various embodiments, the processor 210 may be configured to select the at least one mobile device to perform uplink transmission within a BSS of the electronic device 201, determine uplink transmission information to be used for uplink transmission by the at least one mobile device, and estimate the interference level by which frame reception is not influenced on the basis of at least the uplink transmission information.

According to various embodiments, the uplink transmission information may include at least one piece of information on uplink transmission such as frequency resources configured in the at least one mobile device, a Modulation and Coding Scheme (MCS), the number of spatial streams, or a target Received Signal Strength Indicator (RSSI).

According to various embodiments, the processor 210 may be configured to determine whether interference with the adjacent BSS is allowable on the basis of the configured uplink transmission information to be used for uplink transmission by the at least one mobile device, configure power backoff on the basis of the interference level and transmit the trigger frame when the interference is allowable, and perform a scheduling process for making the interference allowable through a re-configuration of the uplink transmission information when the interference is not allowable.

According to various embodiments, the processor 210 may be configured to configure the power backoff such that interference generated by spatial reuse of the adjacent BSS is included within the determined interference level, and the power backoff is configured in a spatial reuse field of the trigger frame.

According to various embodiments, the processor 210 may be configured to estimate Signal to Interference plus Noise Ratio (SINR) degradation which should be accepted to allow interference on the basis of the determined interference level.

According to various embodiments, the processor 210 may be configured to acquire configuration combinations of uplink transmission information which is not influenced by the estimated SINR degradation and select an optimal configuration combination which maximizes a sum of payloads of the at least one mobile device from among the acquired configuration combinations.

According to various embodiments, the processor 210 may be configured to select the optimal configuration combination on the basis of a determination of whether the acquired configuration combinations can accept the estimated SINR degradation.

According to various embodiments, the processor 210 may be configured to determine whether the acquired configuration combinations can accept the estimated SINR degradation through comparison with SINR degradation from a signal strength and a target RSSI required by the acquired configuration combinations.

According to various embodiments, the processor 210 may be configured to re-configure the uplink transmission information for the at least one mobile device on the basis of the selected optimal configuration combination.

According to various embodiments, the processor 210 may be configured to, when selecting the optimal configuration combination, configure a target RSSI in consideration of uplink transmission power headroom (uplink power headroom) information of the at least one mobile device and configure the maximum number of spatial streams by a smaller value between the maximum numbers of spatial streams which the at least one mobile device and the electronic device 201 can support, and an MCS or a resource unit size is selectively excluded from the configuration combinations.

According to various embodiments, the electronic device 201 may include an Access Point (AP) (for example, the first AP 310 or 430 of FIG. 3 or FIG. 4A) or the network controller 410 of FIG. 4B).

The electronic device 201 (for example, the first AP 310 or 430 of FIG. 3 or FIG. 4A or the network controller 410 of FIG. 4B) according to various embodiments of the disclosure may include at least one mobile device (for example, the first mobile device 330 or 1230 of FIG. 3 or FIG. 12) accessing the electronic device 201, a communication circuit (for example, the communication circuit 230 of FIG. 2) for wireless communication with at least one adjacent Basic Service Set (BSS) (for example, the second AP 320 or 1220 of FIG. 3 or FIG. 12 and the second mobile device 340 or 1240 accessing the second AP 320 or 1220), and a processor (for example, the processor 210 of FIG. 2) operatively connected to the communication circuit 230, wherein the processor 210 may be configured to select a mobile device (for example, the first mobile device 330 or 1230 of FIG. 3 or FIG. 12) to perform uplink transmission from among the at least one mobile device, determine an allowable interference level on the basis of uplink transmission information to be used for uplink transmission by the mobile device, determine whether the adjacent BSS allows the interference level, transmit a first trigger frame including a first configuration based on the interference level to the mobile device and the adjacent BSS through the communication circuit 230 when the adjacent BSS allows the interference level, re-determine the uplink transmission information to be used for the uplink transmission by the mobile device in consideration of allowance of the interference level by the adjacent BSS when the adjacent BSS does not allow the interference level, and transmit a second trigger frame including a second configuration based on the interference level and the re-determined uplink transmission information to the mobile device and the adjacent BSS through the communication circuit 230.

FIG. 5 is a flowchart illustrating a method of operating an electronic device according to various embodiments.

Referring to FIG. 5, in operation 501, a processor (for example, the processor 120 or 210 of FIG. 1 or FIG. 2) (for example, at least one processor including a processing circuit) (hereinafter, referred to as the "processor 210") of the electronic device 201 (for example, the AP 310 or 430 of FIG. 3 or FIG. 4A or the network controller 410 of FIG. 4B) may determine an allowable interference level between APs.

According to an embodiment, the processor 210 may select a mobile device (for example, the mobile device 330 of FIG. 3) to perform uplink transmission and determine an allowable interference level by which reception of the frame is not influenced on the basis of at least uplink transmission information configured for the selected mobile device. For example, the processor 210 may select at least one mobile device to perform uplink transmission, determine uplink transmission information (or configuration) to be used for uplink transmission by the selected mobile devices, and then estimate an interference level allowable for the corresponding uplink transmission. According to an embodiment, the processor 210 may determine how much interference is accepted (or an interference level) for an adjacent BSS in consideration of the strength of a signal between APs and an amount of traffic. For example, the uplink transmission information may include at least one piece of information on uplink transmission such as frequency resources (for example, bandwidth) configured in the selected mobile device, an MCS, or the number of spatial streams.

According to an embodiment, when determining the interference level on the basis of uplink transmission information, the processor 210 may determine whether the determined uplink transmission information is included in a configured condition. According to an embodiment, the processor 210 may determine whether interference can be accepted between APs and/or an allowable interference level on the basis of the determined uplink transmission information. According to an embodiment, when the determined uplink transmission information is not included in the configured condition, the processor 210 may directly transmit a trigger frame through a power backoff configuration. According to an embodiment, when the determined uplink transmission information is included in the configured condition, the processor 210 may perform a scheduling process for making interference allowable through a reconfiguration of the uplink transmission information in operation 503.

In operation 503, the processor 210 may perform the scheduling process on the basis of the determined interference level. According to an embodiment, the processor 210 may determine (for example, re-determine) a configuration (for example, uplink transmission information) to be used for uplink transmission by a mobile device in consideration of allowance of the determined interference level by the corresponding adjacent AP and configure (for example, re-configure) uplink transmission information for the corresponding mobile device. According to various embodiments, when the uplink transmission information is not included in the configured condition, operation 503 may be omitted or may be selectively performed.

In operation 505, the processor 210 may transmit the trigger frame. According to an embodiment, a power backoff value may be inserted into the trigger frame and transmitted such that interference generated by spatial reuse by the adjacent BSS (for example, an adjacent AP or a mobile device accessing the adjacent AP to operate) is included within the determined allowable interference level. According to an embodiment, the processor 210 may determine a configuration (for example, uplink transmission information) to be used for uplink transmission by mobile devices pre-selected for uplink transmission in consideration of allowance of the determined interference level by the adjacent BSS, insert the determined configuration into the trigger frame through a communication circuit (for example, the communication circuit 230 of FIG. 2), and transmit the trigger frame.

Figure 6:
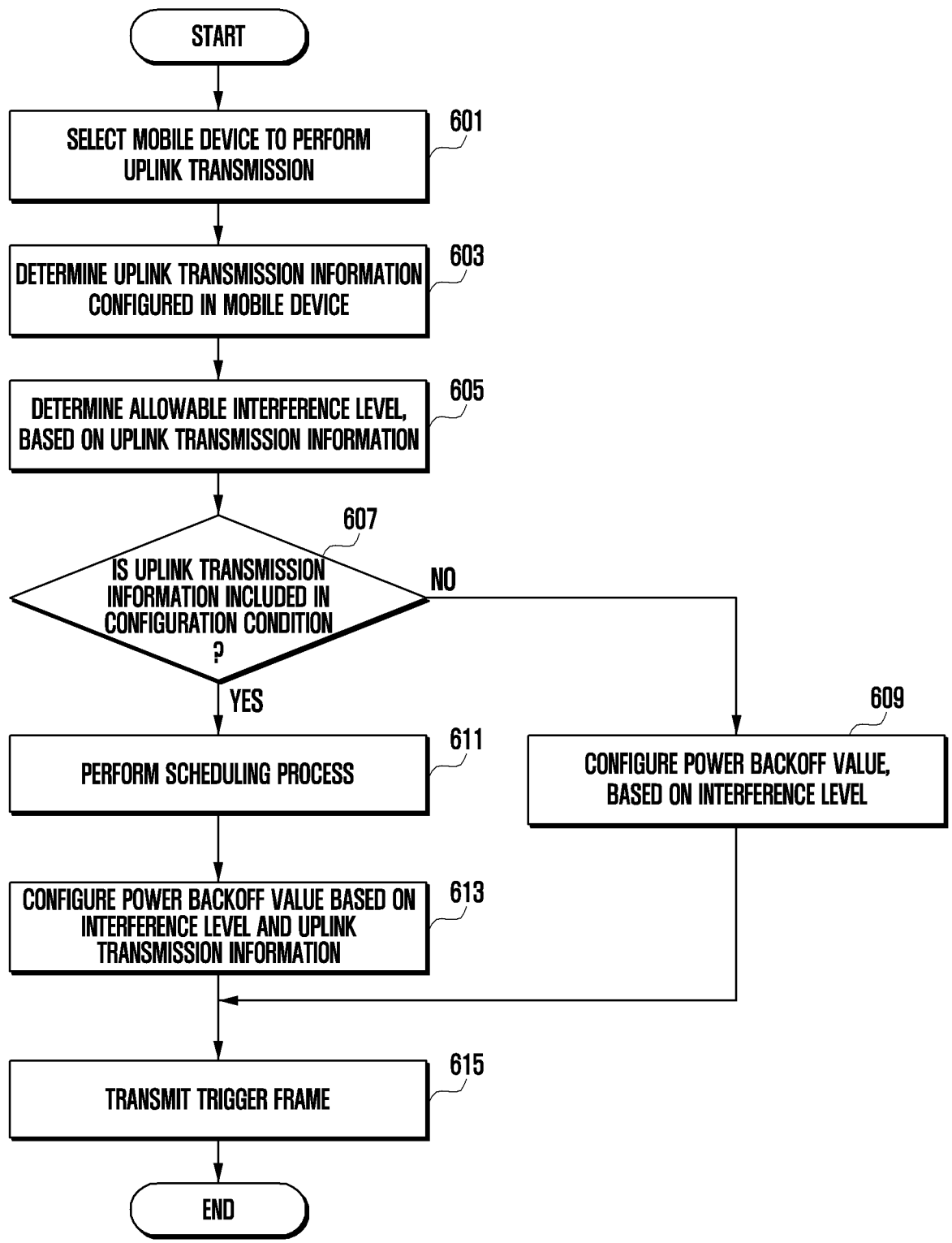
FIG. 6 is a flowchart illustrating a method of operating an electronic device according to various embodiments.

FIG. 6 is a flowchart illustrating a method of operating an electronic device according to various embodiments.

Referring to FIG. 6, in operation 601, a processor (for example, the processor 120 or 210 of FIG. 1 or FIG. 2) (for example, at least one processor including a processing circuit) (hereinafter, referred to as the "processor 210") of the electronic device 201 (for example, the AP 310 or 430 of FIG. 3 or FIG. 4A or the network controller 410 of FIG. 4B) may select a mobile device to perform uplink transmission. According to an embodiment, the processor 210 may select at least one mobile device (for example, target mobile device) to perform uplink transmission on the basis of uplink scheduling.

In operation 603, the processor 210 may determine uplink transmission information configured for the selected mobile device. For example, the processor 210 may determine uplink transmission information (or configuration) which was configured according to performance of uplink scheduling for the selected mobile device and is to be used for uplink transmission. According to an embodiment, the uplink transmission information may include at least one piece of information on uplink transmission such as frequency resources (for example, bandwidth) configured in the selected mobile device, an MCS, or the number of spatial streams.

In operation 605, the processor 210 may determine an allowable interference level by which frame reception is not influenced on the basis of at least the uplink transmission information. For example, after determining the uplink transmission information (or configuration) to be used for uplink transmission by the selected mobile devices, the processor 210 may estimate an interference level allowable for the corresponding uplink transmission.

In operation 607, the processor 210 may determine whether the uplink transmission information configured for the selected mobile devices is included in a preset configuration condition. According to an embodiment, the processor 210 may determine whether interference cannot be accepted between APs (for example, the interference level cannot be accepted) or the allowable interference level is very low (or is lower than or equal to a configured reference) on the basis of the configured uplink transmission information.

In operation 607, when it is determined that the uplink information is not included in the configuration condition ("No" of operation 607), the processor 210 may configure a power backoff value in the trigger frame on the basis of the interference level determined in operation 605 in operation 609. For example, the processor 210 may configure a power backoff value in a field related to a spatial reuse parameter (for example, a spatial reuse field) in the trigger frame. A method of configuring power backoff according to an embodiment is described with reference to FIG. 9 below. The trigger frame according to an embodiment is described with reference to FIGS. 7 and 8 below.

When it is determined that the uplink transmission information is included in the configuration condition ("Yes" of operation 607) in operation 607, the processor 210 may perform a scheduling process on the basis of the determined interference level in operation 611. According to an embodiment, the processor 210 may determine a configuration (for example, uplink transmission information) to be used for uplink transmission by the mobile device in consideration of allowance of the determined interference level by the corresponding adjacent AP and configure uplink transmission information for the corresponding mobile device. A method of performing the scheduling process according to an embodiment is described with reference to FIG. 10 below.

In operation 613, the processor 210 may configure the power backoff value based on the interference level and uplink transmission information based on the scheduling process in the trigger frame. For example, the processor 210 may configure the power backoff value and the uplink transmission information in a field related to a spatial reuse parameter in the trigger frame. The trigger frame according to an embodiment is described with reference to FIGS. 7 and 8 below.

In operation 615, the processor 210 may transmit the trigger frame to the selected mobile device through a communication circuit (for example, the communication circuit 230 of FIG. 2). According to an embodiment, when operation 611 and operation 613 are performed, the processor 210 may re-determine a configuration (for example, uplink transmission information) to be used for uplink transmission by mobile devices pre-selected for uplink transmission in consideration of allowance of the determined interference level by the adjacent BSS, insert the determined configuration into the trigger frame, and transmit the trigger frame to the corresponding mobile device. According to an embodiment, when operation 609 is performed, the processor 210 may insert a power backoff value into the trigger frame and transmit the trigger frame such that interference generated by spatial reuse of the adjacent BSS (for example, the adjacent AP or the mobile device accessing the adjacent AP to operate) is included within the determined allowable interference level.

Figure 7:
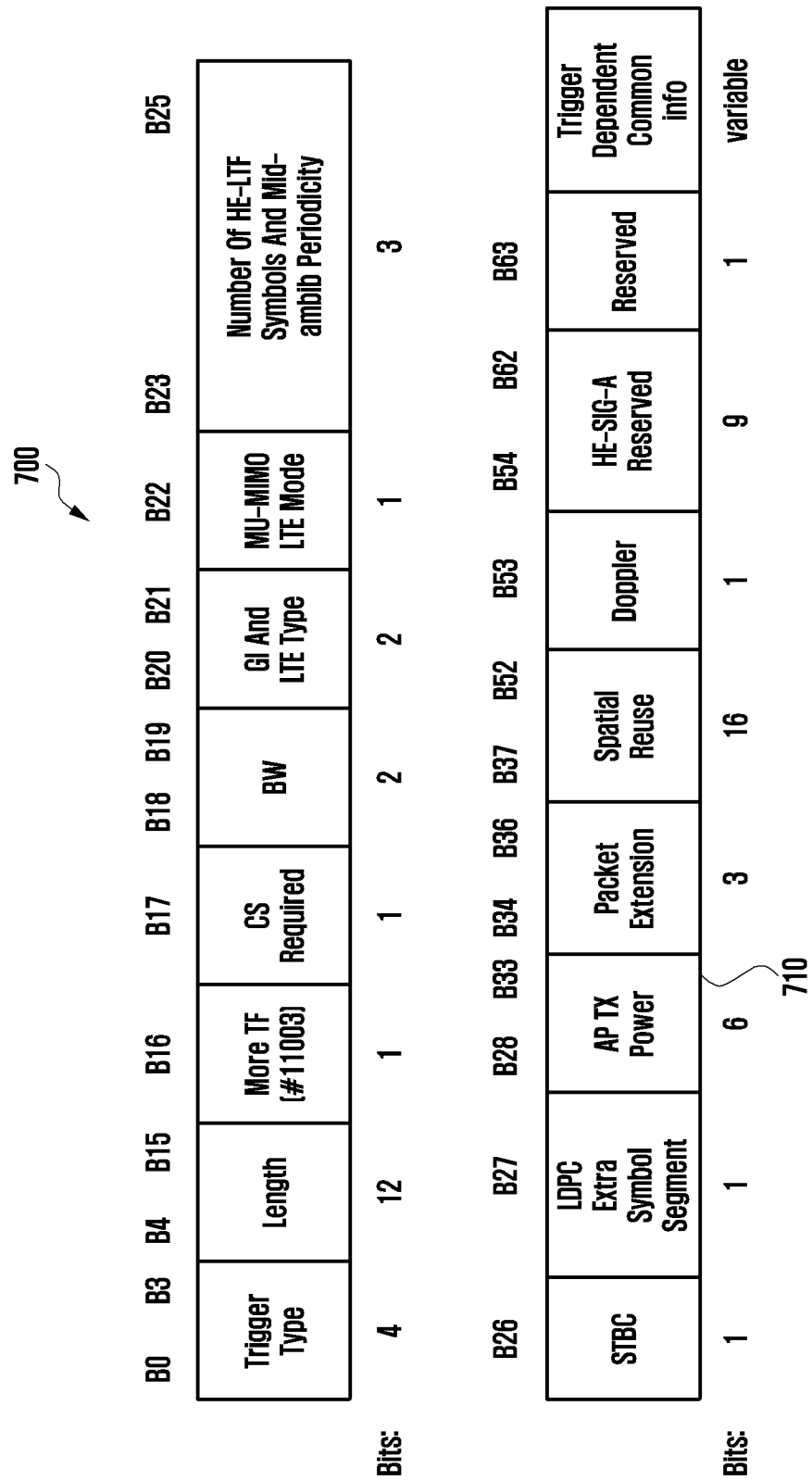
FIG. 7 and FIG. 8 illustrate examples of the trigger frame according to various embodiments.
Figure 8:
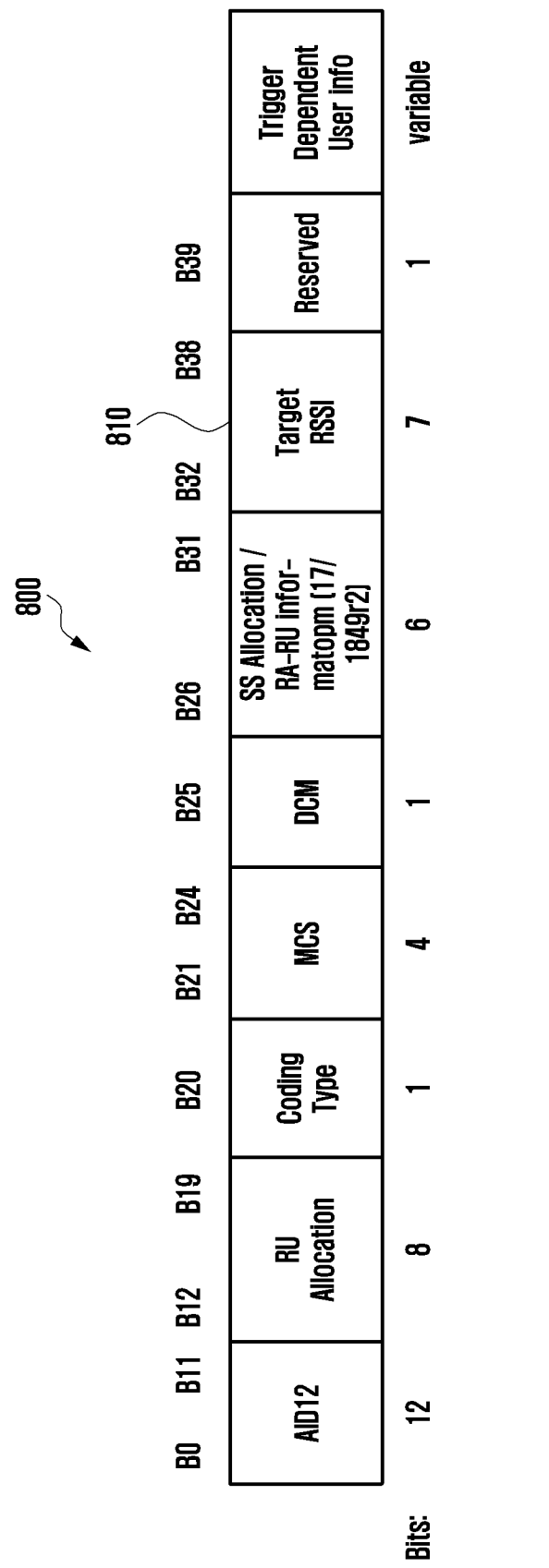

FIG. 7 and FIG. 8 illustrate examples of the trigger frame according to various embodiments.

In various embodiments, FIG. 7 illustrates an example of a common information field format 700 of the trigger frame, and FIG. 8 illustrates an example of a user information field format 800 of the trigger frame. According to an embodiment, although FIG. 7 separately illustrates the common information field format 700, the common information field format may be one continuous format.

According to an embodiment, when the AP transmits the trigger frame and performs uplink transmission scheduling, values shown in each of the trigger frames of FIG. 7 and FIG. 8 may be specified. For example, the trigger frame may include (or specify) various pieces of information (or configurations) which should be used for uplink transmission, such as a scheduled mobile device, transmission power to be used by each scheduled mobile device, available frequency resources, the number of spatial streams, or an available MCS. For example, the trigger frame may include various pieces of information which should be used for uplink transmission such as information indicating mobile devices which are scheduled, transmission power which should be used by each scheduled mobile device, frequency resources which should be used, the number of spatial streams which should be used, or an MCS which should be used. According to an embodiment, a value of the target RSSI field in the user information field of FIG. 8 may indicate a degree of the strength of a signal of the AP in uplink transmission of the scheduled mobile device.

According to an embodiment, the mobile device may estimate a degree of signal attenuation with reference to trigger frame transmission power of the AP specified in an AP transmission power field (TX power field) 710 of the trigger frame and the reception signal strength of the received trigger frame and configure transmission power such that the reception signal strength of the AP in uplink transmission becomes a value specified in a target RSSI field 810. For example, at the time point at which the AP performs uplink transmission scheduling, the AP may be aware of information on mobile devices to perform uplink transmission, frequency resources to be used, the number of spatial streams to be used, an MCS to be used, or a degree of signal strength of uplink transmission from the mobile device in the AP.

According to an embodiment, after performing an uplink user scheduling process, the AP may transmit a trigger frame in order to induce the scheduled mobile devices to perform uplink transmission. According to an embodiment, the trigger frame may be changed and specified to correspond to uplink transmission information (or configuration) determined in the scheduling process according to various embodiments. According to an embodiment, since the scheduled mobile devices perform uplink transmission using uplink transmission information specified in the trigger frame after receiving the trigger frame, the corresponding uplink transmission may allow the interference level determined in the previous step.

Figure 9:
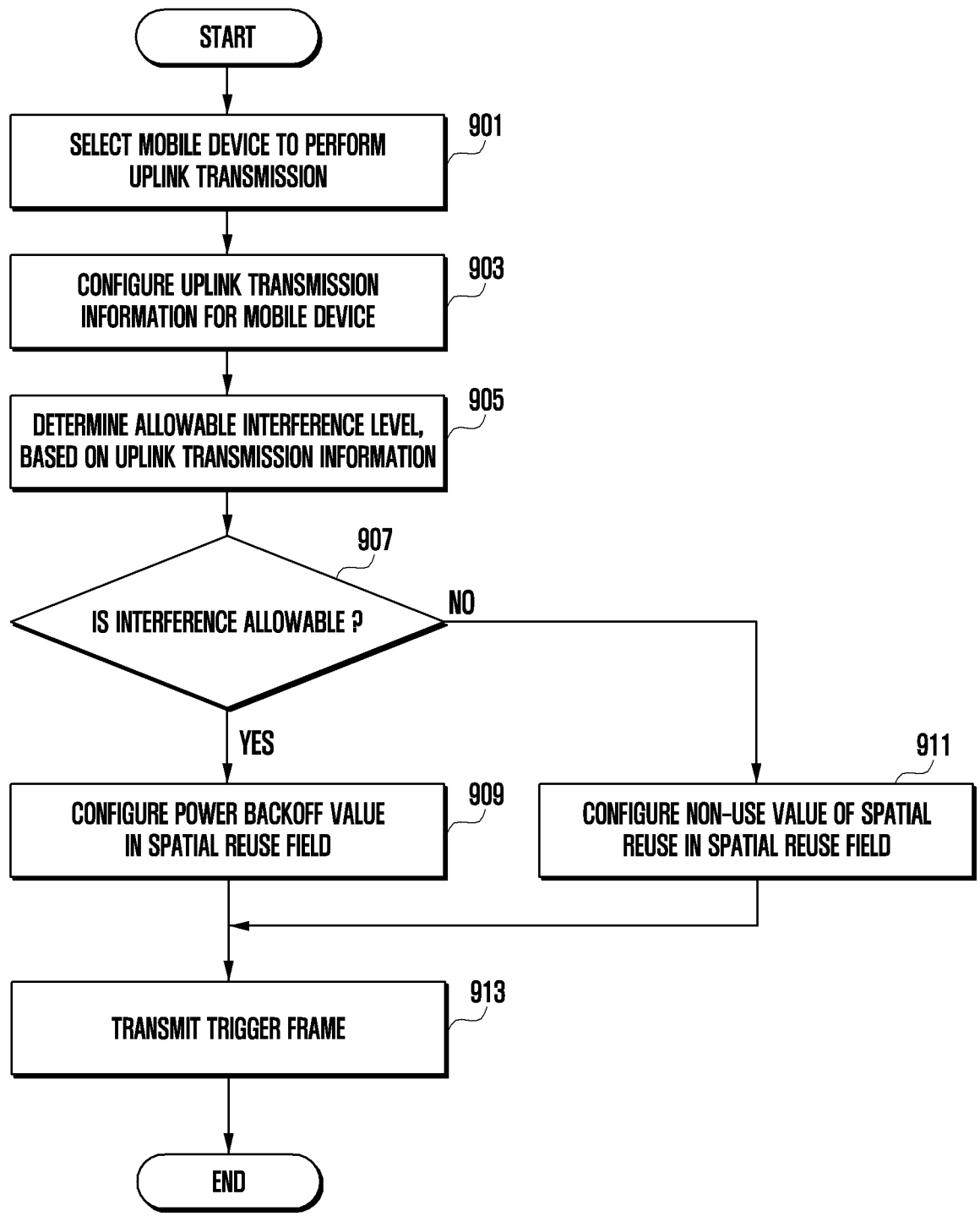
FIG. 9 is a flowchart illustrating a detailed method of operating an electronic device according to various embodiments.

FIG. 9 is a flowchart illustrating a method of operating an electronic device according to various embodiments.

According to various embodiments, FIG. 9 illustrates an example of the operation for configuring a spatial reuse field value of a common information field of a trigger frame on the basis of a determined interference level according to various embodiments when the electronic device 201 (for example, the AP 310 or 430 of FIG. 3 or FIG. 4A or the network controller 410 of FIG. 4B) transmits the trigger frame.

Referring to FIG. 9, in operation 901, a processor (for example, the processor 120 or 210 of FIG. 1 or FIG. 2) (for example, at least one processor including a processing circuit) (hereinafter, referred to as the "processor 210") of the electronic device 201 (for example, the AP 310 or 430 of FIG. 3 or FIG. 4A or the network controller 410 of FIG. 4B) may select mobile devices to perform uplink transmission. According to an embodiment, the processor 210 may select at least one mobile device (for example, target mobile device) to perform uplink transmission on the basis of uplink scheduling.

In operation 903, the processor 210 may configure uplink transmission information for the mobile devices. According to an embodiment, for the scheduled mobile devices, the processor 210 may configure at least one piece of information on uplink transmission such as frequency resources (for example, bandwidth), an MCS, the number of spatial streams, or a target RSSI. This is described with reference to [Table 1] below.

In operation 905, the processor 210 may determine an allowable interference level on the basis of the uplink transmission information. According to an embodiment, for the selected mobile devices, the processor 210 may determine an allowable interference level between APs on the basis of uplink transmission information (or configuration), which was configured according to performance of uplink scheduling and is to be used for uplink transmission. For example, after determining uplink transmission information (or configuration) to be used for uplink transmission by the selected mobile devices, the processor 210 may estimate an allowable interference level for the corresponding uplink transmission in accordance with the description made with reference to [Equation 1] to [Equation 5]. According to an embodiment, the determination of the interference level based on the uplink scheduling is described by way of example with reference to [Table 1] below.

According to an embodiment, [Table 1] shows an example of a sensitivity level according to an MCS defined in the IEEE 802.11 ax standard. Examples in which allowable interference levels are calculated are described with reference to [Table 1]. According to an embodiment, it may be assumed that a specific mobile device is scheduled to perform transmission through one spatial stream in a bandwidth of 20 MHz using an MCS with 256-QAM at 5/6 coding rate and the target reception signal strength to be configured by the AP in a target RSSI field for the mobile device is about −54 dBm. According to an embodiment, through comparison between the sensitivity level of the corresponding MCS and the target reception signal strength, it may be noted that interference (or interference level) of about 3 dB is allowable (or the interference level may be acquired). According to an embodiment, when the allowable interference level is configured, an additional protection margin may be configured for the calculated (or obtained) interference level. For example, when the MCS, the bandwidth, or the number of spatial streams is changed, the allowable interference level may be calculated in proper consideration of the corresponding changed matters.

According to an embodiment, when a plurality of mobile devices are scheduled, an allowable interference level may be obtained for each of the mobile devices through the same method described above, and an allowable final interference level may be lastly determined for the corresponding uplink transmission in consideration of the obtained interference levels. For example, a minimum value of the allowable interference levels calculated for the mobile devices may be configured as the finally allowable interference level for the corresponding uplink transmission. The various embodiments are not limited thereto, and the description is only an example. Accordingly, the allowable interference level may be calculated through various different methods.

In operation 907, the processor 210 may determine whether interference is allowable on the basis of the determined interference level. According to an embodiment, the processor 210 may determine whether the determined interference level is included in an allowable interference range for the adjacent BSS on the basis of the configured uplink transmission information. According to an embodiment, the processor 210 may determine whether interference is allowable between APs and/or determine an allowable interference level (for example, determine whether the interference

TABLE 1

| Modulation | | | Minimum sensitivity (20 MHz PPDU) (dBm) | Minimum sensitivity (40 MHz PPDU) (dBm) | Minimum sensitivity (80 MHz PPDU) (dBm) | Minimum sensitivity (160 MHz or 80 + 80 MHz PPDU) (dBm) |
|---|---|---|---|---|---|---|
| Without DCM | With DCM | Rate (R) | | | | |
| N/A | BPSK | 1/2 | −82 | −79 | −76 | −73 |
| BPSK | QPSK | 1/2 | −82 | −79 | −76 | −73 |
| QPSK | 16-QAM | 1/2 | −79 | −76 | −73 | −70 |
| QPSK | 16-QAM | 3/4 | −77 | −74 | −71 | −68 |
| 16-QAM | N/A | 1/2 | −74 | −71 | −68 | −65 |
| 16-QAM | N/A | 3/4 | −70 | −67 | −64 | −61 |
| 64-QAM | N/A | 2/3 | −66 | −63 | −60 | −57 |
| 64-QAM | N/A | 3/4 | −65 | −62 | −59 | −56 |
| 64-QAM | N/A | 5/6 | −64 | −61 | −58 | −55 |
| 256-QAM | N/A | 3/4 | −59 | −56 | −53 | −50 |
| 256-QAM | N/A | 5/6 | −57 | −54 | −51 | −48 |
| 1024-QAM | N/A | 3/4 | −54 | −51 | −48 | −45 |
| 1024-QAM | N/A | 5/6 | −52 | −49 | −46 | −43 | level is lower than or equal to a configured reference) on the basis of the configured uplink transmission information.

In operation 907, when it is determined that the interference is allowable ("Yes" of operation 907), the processor 210 may configure a power backoff value in a spatial reuse field of the trigger frame on the basis of the determined interference level in operation 909. According to an embodiment, the processor 210 may configure the power backoff value in accordance with the description made with reference to [Equation 1] to [Equation 5]. According to an embodiment, the processor 210 may configure the power backoff value in the trigger frame such that interference generated by spatial reuse of the adjacent BSS (for example, the adjacent AP or the mobile device accessing the adjacent AP to operate) is included within the determined allowable interference level.

In operation 907, when it is determined that the interference is not allowable ("No" of operation 907), the processor 210 may configure a non-use value indicating the non-use of spatial reuse in a spatial reuse field of the trigger frame in operation 911. According to various embodiments, when it is determined that the interference is not allowable according to the configured uplink transmission information in operation 907, a scheduling process may be performed on the basis of the interference level as described with reference to FIG. 6. A method of performing the scheduling process according to an embodiment is described in detail with reference to FIG. 10 below.

In operation 913, the processor 210 may transmit the trigger frame to the selected mobile device through a communication circuit (for example, the communication circuit 230 of FIG. 2). According to an embodiment, when operation 911 is performed, the processor 210 may transmit the trigger frame in which the non-use value of the spatial reuse is configured to the selected mobile device through a communication circuit (for example, the communication circuit 230 of FIG. 2). According to another embodiment, when operation 909 is performed, the processor 210 may transmit the trigger frame in which the power backoff value is configured to the selected mobile device through a communication circuit (for example, the communication circuit 230 of FIG. 2).

Figure 10:
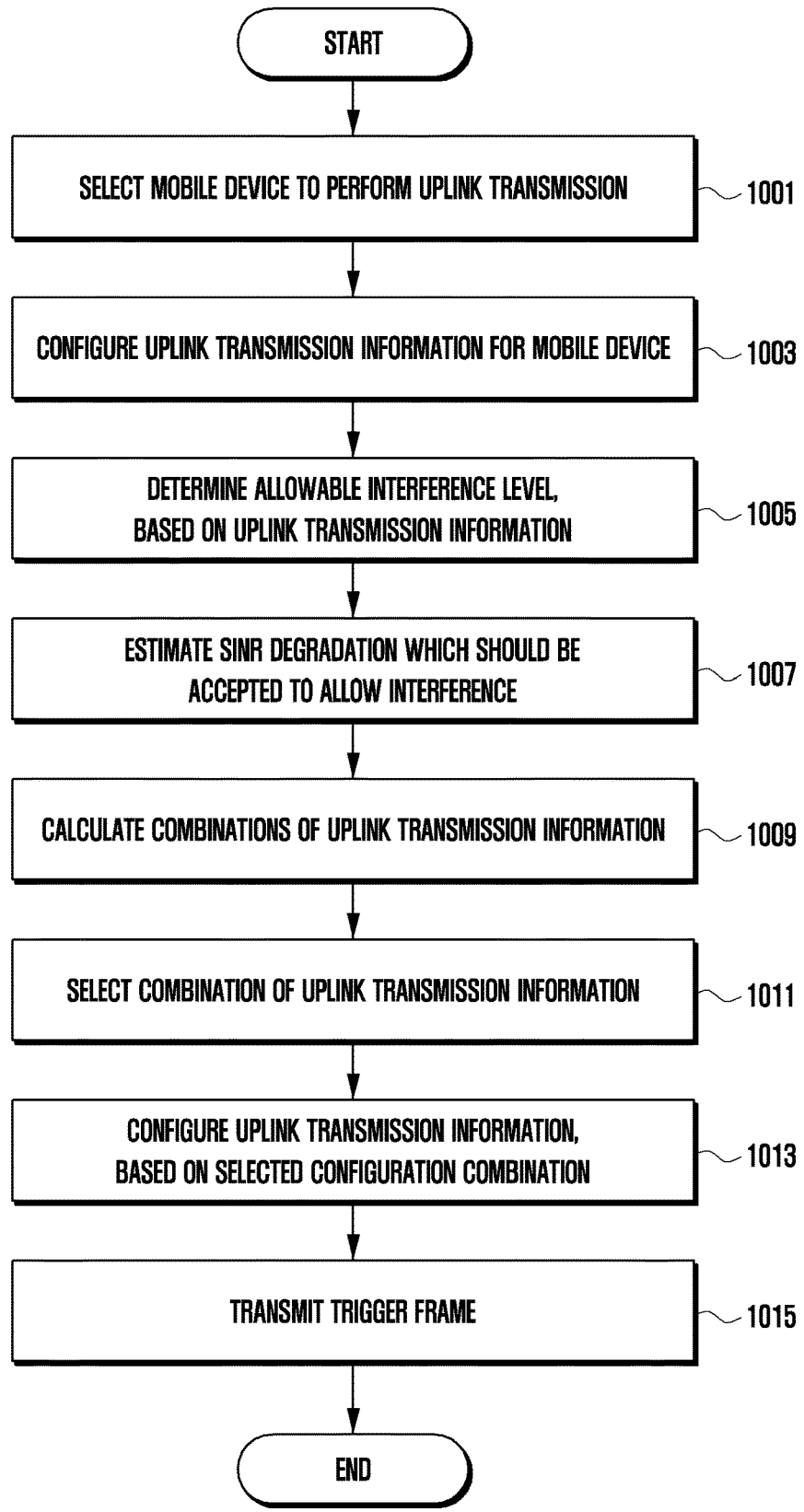
FIG. 10 is a flowchart illustrating a detailed method of operating an electronic device according to various embodiments.

FIG. 10 is a flowchart illustrating a method of operating an electronic device according to various embodiments.

According to various embodiments, FIG. 10 illustrates an example in which the electronic device 101 (for example, the AP 310 or 430 of FIG. 3 or FIG. 4A) or the network controller 410 of FIG. 4B) transmits a trigger frame for a scheduling process and a scheduled mobile device.

Referring to FIG. 10, in operation 1001, a processor (for example, the processor 120 or 210 of FIG. 1 or FIG. 2) (for example, at least one processor including a processing circuit) (hereinafter, referred to as the "processor 210") of the electronic device 201 (for example, the AP 310 or 430 of FIG. 3 or FIG. 4A or the network controller 410 of FIG. 4B) may select mobile devices to perform uplink transmission. According to an embodiment, the processor 210 may select at least one mobile device (for example, target mobile device) to perform uplink transmission on the basis of uplink scheduling.

In operation 1003, the processor 210 may configure uplink transmission information for the mobile devices. According to an embodiment, for the scheduled mobile device, the processor 210 may configure at least one piece of information on uplink transmission such as frequency resources (for example, bandwidth), an MCS, the number of spatial streams, or a target RSSI.

In operation 1005, the processor 210 may determine an allowable interference level on the basis of the uplink transmission information. According to an embodiment, for the selected mobile devices, the processor 210 may determine an allowable interference level between APs on the basis of uplink transmission information (or configuration), which was configured according to performance of uplink scheduling and is to be used for uplink transmission. For example, after determining uplink transmission information (or configuration) to be used for uplink transmission by the selected mobile devices, the processor 210 may estimate an allowable interference level for the corresponding uplink transmission in accordance with the description made with reference to [Equation 1] to [Equation 5].

In operation 1007, Signal to Interference plus Noise Ration (SINR) degradation may be estimated on the basis of the determined interference level. According to an embodiment, the processor 210 may estimate SINR degradation which should be accepted to allow the interference on the basis of the determined interference level. According to an embodiment, a configuration to be used for uplink transmission by mobile devices (for example, at least one mobile device selected in operation 1001) pre-selected for uplink transmission may be determined in consideration of allowance of the interference level determined in operation 1005 of FIG. 10. To this end, according to various embodiments, a degree of SINR degradation which should be endured may be estimated in comparison with the case in which there is no interference to allow a specific interference level. According to an embodiment, SINR degradation may be acquired by [Equation 6] below.

$$SINR\ degradation\ (dB) = 10\log\frac{\text{Strength of noise} + \text{Strength of interference to be allowed (mW)}}{\text{Strength of noise (mW)}} \quad \text{Equation 6}$$

In [Equation 6], with respect to the unit in brackets, for example, the unit of the strength of noise and allowable interference may be megawatt(s) (mW) rather than decibels above 1 milliwatt (dBm), and the unit of SINR degradation acquired by [Equation 6] may be decibel (dB).

Figure 11:
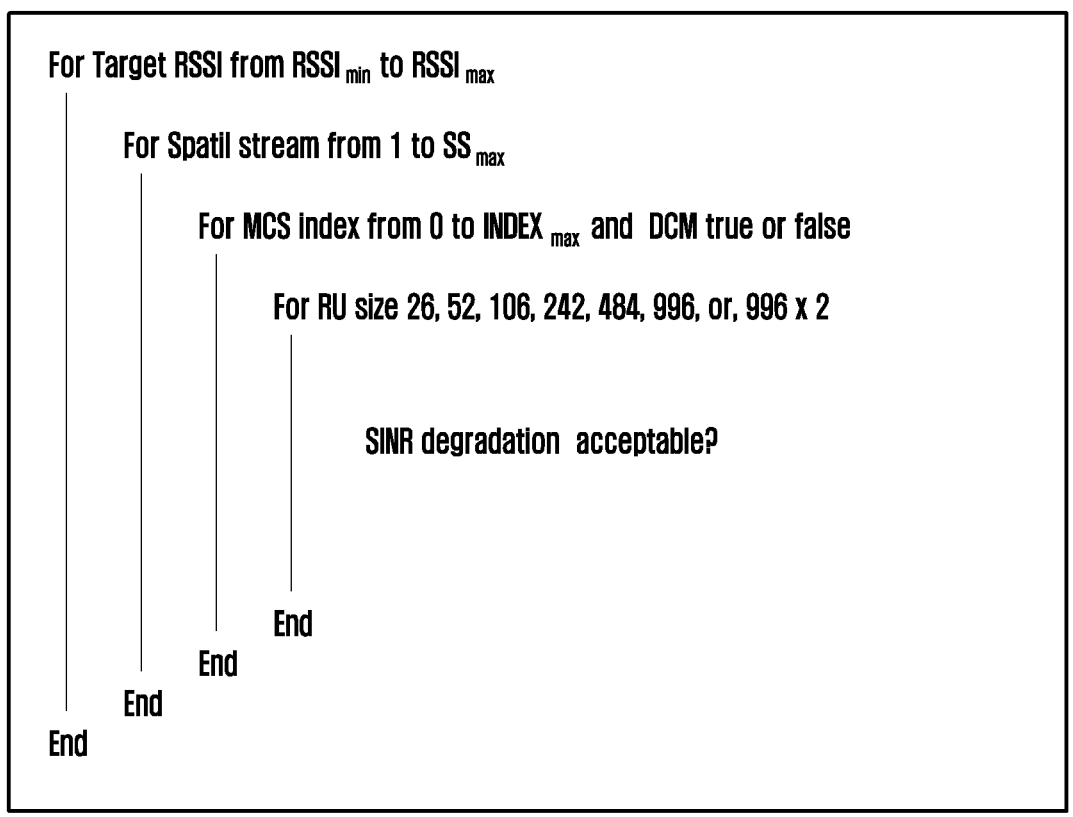
FIG. 11 illustrates the operation for calculating combinations of uplink transmission information according to various embodiments.

In operation 1009, the processor 210 may calculate combinations of uplink transmission information. According to an embodiment, the processor 210 may perform an algorithm as illustrated in FIG. 11 for each of the mobile devices selected for uplink transmission to calculate combinations of uplink transmission information that may accept the estimated SINR degradation. According to an embodiment, the uplink transmission information may include at least one piece of information on uplink transmission such as frequency resources (for example, bandwidth) for the selected mobile devices, an MCS, the number of spatial streams, or a target RSSI. According to an embodiment, the processor 210 may calculate combinations of the uplink transmission information that may endure SINR degradation and an example thereof is illustrated in FIG. 11.

FIG. 11 illustrates the operation for calculating combinations of uplink transmission information according to various embodiments.

According to various embodiments, FIG. 11 illustrates an example of an algorithm for discovering configuration combinations of the uplink transmission information which is not influenced by SINR degradation.

According to an embodiment, when SINR degradation which should be endured to allow the interference is estimated as described above, in selection of a specific mobile device, the processor 210 may discover combinations that do not make a problem due to the estimated SINR degradation in all available cases in which uplink transmission information such as the target RSSI, the frequency resources, the MCS, or the number of spatial streams can be configured. According to an embodiment, the processor 210 may perform the algorithm of FIG. 11 to acquire the combinations of uplink transmission information, and the following matters may be considered when the algorithm is performed. For example, in the IEEE 802.11ax standard, the target RSSI can be configured in the unit of about 1 dBm from about −20 dBm to about −110 dBm, and may be configured in consideration of uplink transmission power headroom (uplink power headroom) information of at least one mobile device within a configurable range. For example, the maximum number of configurable spatial streams may be configured by a smaller value between the maximum numbers of spatial streams which can be supported by at least one mobile device and the AP. For example, among a configurable MCS index and/or a Resource Unit (RU) size, a configuration which is not supported by the AP or the mobile device or is not used for current transmission may be excluded from the configurable combinations.

Referring back to FIG. 10, in operation 1011, the processor 210 may select a combination of uplink transmission information. According to an embodiment, the processor 210 may select a combination (for example, optimal configuration combination) of uplink transmission information that may maximizes a total sum of payloads of the mobile devices selected for uplink transmission from among the calculated available combinations. According to an embodiment, an example of the selection of the combination of uplink transmission information is described with reference to [Table 1] above.

According to an embodiment, when performing the algorithm of FIG. 11, the processor 210 may determine whether a specific combination can accept the SINR degradation estimated in the previous step among configuration combinations of an available target RSSI, the number of spatial streams, frequency resources, or an MCS. According to an embodiment, whether the configuration combination can accept the estimated SINR degradation may be identified through comparison with SINR degradation from the signal strength and the target RSSI required for the corresponding configuration combination. For example, it may be assumed that, for example, SINR degradation of 5 dB should be accepted with reference to the sensitivity level defined in the IEEE 802.11ax standard as shown in [Table 1] and a combination of target RSSI=−57 dBm, number of spatial streams=1, bandwidth=20 MHz (RU size=242), 64 QAM, and 5/6 rate channel coding is identified. According to an embodiment, since the attenuation level of −64 dBm required for the combination is lower than −62 dBm considering the SINR degradation of 5 dB from the target RSSI of −57 dBm, the SINR degradation of 5 dB may be accepted.

Various embodiments describe the use of an attenuation level of the IEEE 802.11ax standard by way of example, but are not limited thereto, and a unique specification of each chip-set may be used and a protection value may be configured in addition to SINR degradation which should be accepted in various embodiments. According to an embodiment, with respect to each of the mobile devices selected for uplink transmission, one or more combinations for configuring a target RSSI, frequency resources, an MCS, or the number of spatial streams may be obtained through the algorithm of FIG. 11, and a combination of uplink transmission information which maximizes a total sum of payloads of the mobile devices selected for uplink transmission may be selected from among the obtained combinations.

In operation 1013, the processor 210 may configure uplink transmission information for the mobile device on the basis of the selected configuration combination. According to an embodiment, the processor 210 may configure a trigger frame by specifying uplink transmission information of the determined configuration combination for the mobile device selected for uplink transmission.

In operation 1015, the processor 210 may transmit the trigger frame to the mobile device through a communication circuit (for example, the communication circuit 230 of FIG. 2). According to an embodiment, when uplink transmission information to be used for uplink transmission is determined, the processor 210 may transmit the trigger frame to at least one mobile device selected for uplink transmission through a communication circuit (for example, the communication circuit 230 of FIG. 2) in order to induce mobile devices selected for uplink transmission to perform uplink transmission.

Figure 12:
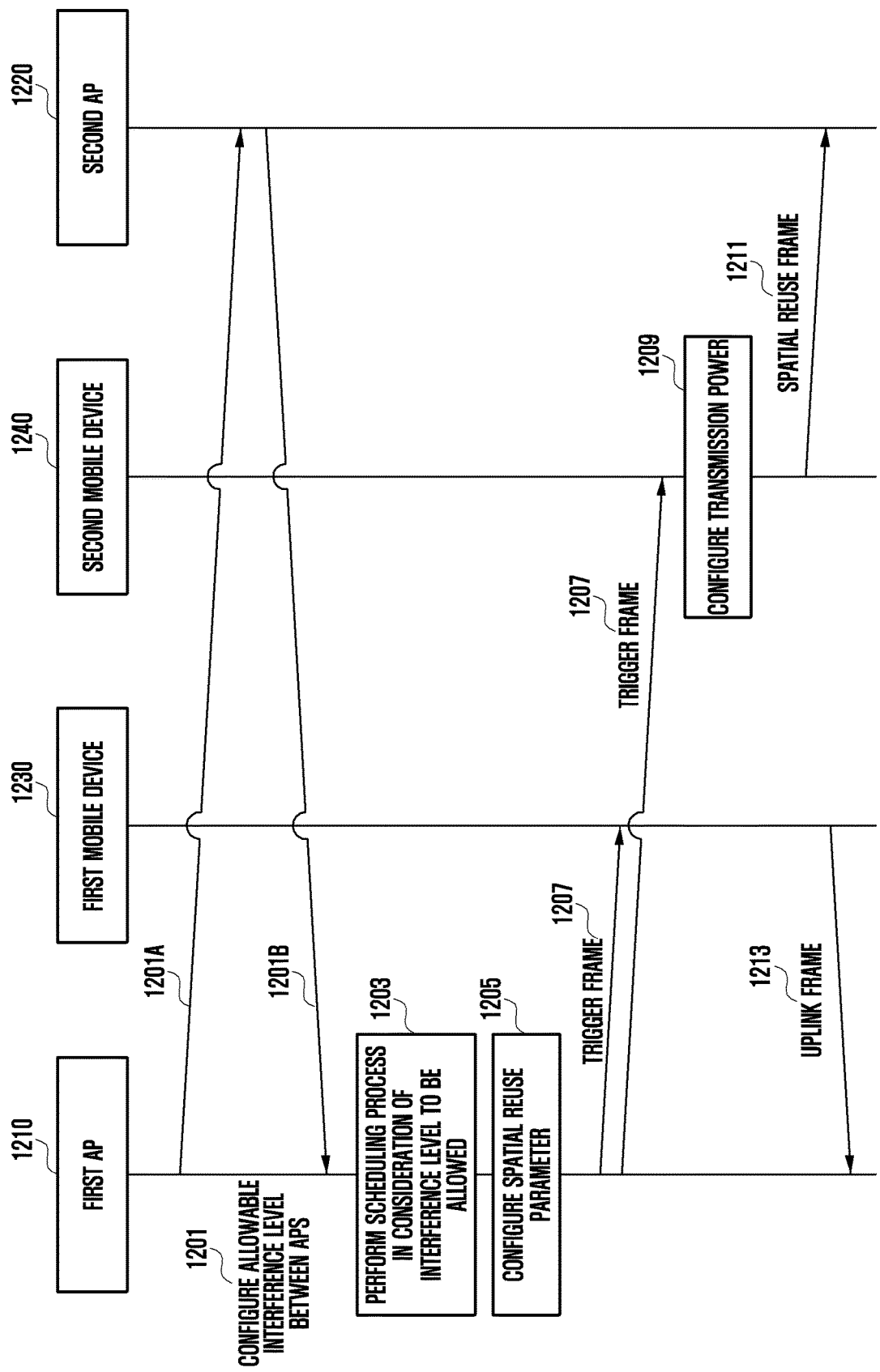
FIG. 12 illustrates an example of the operation of spatial reuse in a network environment according to various embodiments.

FIG. 12 illustrates an example of the operation of spatial reuse in a network environment according to various embodiments.

According to an embodiment, in an example of FIG. 12, a first mobile device 1230 may access (or may be connected to) a first AP 1210 and a second mobile device 1240 may access (or may be connected to) a second AP 1220.

Referring to FIG. 12, in operation 1201, the first AP 1210 may determine an interference level by which frame reception from the first mobile device 1230 accessing the first AP is not influenced. According to various embodiments, in operation 1201A and operation 1201B, signaling for configuring an interference level may be performed between the first AP 1210 and the second AP 1220. For example, in operation 1201A and operation 1201B, the first AP 1210 may transmit and receive a signal for determining an interference level to and from an AP (for example, the second AP 1220) of an adjacent BSS. According to an embodiment, in operation 1201A, the first AP 1210 may make a request for information on an amount of traffic which the second AP 1220 should process. According to an embodiment, in operation 1201B, the second AP 1220 may determine traffic of the second AP 1220 in response to reception of the request from the first AP 1210 and transmit information on the amount of traffic of the second AP 1220 to the first AP 1210 on the basis of the determination result. According to an embodiment, in operation 1201, the first AP 1210 may determine an interference level indicating how much interference should be allowed for the adjacent BSS on the basis of at least the amount of traffic received from the second AP 1220 and/or the reception signal strength based on the signal received from the second AP 1220.

According to an embodiment, the first AP 1210 may configure a spatial reuse field value of a common information field such that interference generated by spatial reuse is included within a range of the determined interference level in response to the determination of the interference level in operation 1201 and transmit a trigger frame to the second mobile device 1240 of the adjacent BSS. Accordingly, it is possible to control interference generated by spatial reuse of the adjacent BSS (for example, the second AP 1220 or the second mobile device 1240 accessing the second AP 1220 to operate). According to various embodiments, in a network environment in which a plurality of APs 1210 and 1220 operate, the APs 1210 and 1220 may efficiently perform spatial reuse while protecting frame reception from the mobile devices 1230 and 1240 which the APs themselves access from the interference, thereby improving transmission efficiency in an aspect of the total network.

According to an embodiment, the first AP 1210 may perform spatial reuse after performing an uplink scheduling process according to the determined interference level in response to the interference level determined in operation 1201. For example, when the interference level to be allowed between the first AP 1210 and the second AP 1220 is determined, the first AP 1210 may perform the scheduling process in consideration of the interference level to be allowed in operation 1203. According to an embodiment, the first AP 1210 may configure a target RSSI, an MCS, a bandwidth, or the number of spatial streams to allow the determined interference level and perform the scheduling process.

In operation 1205, the first AP 1210 may configure a spatial reuse parameter on the basis of selected uplink transmission information according to the scheduling process. In operation 1207, the first AP 1210 may transmit a trigger frame in which the spatial reuse parameter is configured to the first mobile device 1230 accessing the first AP 1210 and the second mobile device 1240 (for example, scheduled mobile device) of the adjacent BSS.

In operation 1213, the first mobile device 1230 may perform uplink transmission in response to the trigger frame.

In operation 1209, the second mobile device 1240 of the adjacent BSS or the second AP 1220 may configure transmission power to satisfy a power backoff condition specified in the trigger frame and re-occupy a radio medium (for example, a radio channel). According to an embodiment, in operation 1211, the second mobile device 1240 may transmit a spatial reuse frame to the second AP 1220 in response to reception of the trigger frame.

According to various embodiments, whenever uplink scheduling is performed, the AP may perform the scheduling process and trigger frame transmission as described above. According to an embodiment, when the network environment is changed and thus the allowable interference level between APs is updated and determined again, the scheduling process and the trigger frame transmission may be performed again thereafter to allow the updated interference level. Through such a method, according to various embodiments, it is possible to efficiently perform spatial reuse in an aspect of the total network in a network environment in which a plurality of APs operate, and accordingly to improve a communication capacity of the total network or satisfy quality of service requirements of users.

A method of operating the electronic device 101 according to various embodiments of the disclosure may include an operation of determining an allowable interference level for spatial reuse in connection with an adjacent Basic Service Set (BSS) in a network environment in which a plurality of electronic devices operate, an operation of determining a configuration to be used for uplink transmission by at least one mobile device connected to the electronic device on the basis of allowance of the determined interference level by the adjacent BSS, and an operation of transmitting a trigger frame including the determined configuration to the mobile device through a communication circuit.

According to various embodiments, the operation of determining the interference level may include an operation of selecting the at least one mobile device to perform uplink transmission within a BSS of the electronic device, an operation of determining uplink transmission information to be used for uplink transmission by the at least one mobile device, and an operation of estimation the interference level by which frame reception is not influenced on the basis of at least the uplink transmission information.

According to various embodiments, the uplink transmission information may include at least one piece of information on uplink transmission such as frequency resources configured in the at least one mobile device, a Modulation and Coding Scheme (MCS), the number of spatial streams, or a target Received Signal Strength Indicator (RSSI).

According to various embodiments, the operation of transmitting the trigger frame may include an operation of determining whether interference with the adjacent BSS is allowable on the basis of the configured uplink transmission information to be used for uplink transmission by the at least one mobile device, an operation of configuring power backoff on the basis of the interference level and transmitting the trigger frame when the interference is allowable, and an operation of performing a scheduling process for making the interference allowable through a re-configuration of the uplink transmission information when the interference is not allowable.

According to various embodiments, the operation of performing the scheduling process may include an operation of configuring the power backoff such that interference generated by spatial reuse of the adjacent BSS is included within the determined interference level, and the power backoff may be configured in a spatial reuse field of the trigger frame.

According to various embodiments, the operation of performing the scheduling process may include an operation of estimating SINR degradation which should be accepted to allow interference on the basis of the determined interference level.

According to various embodiments, the operation of performing the scheduling process may include an operation of acquiring configuration combinations of uplink transmission information which is not influenced by the estimated SINR degradation, an operation of selecting an optimal configuration combination which maximizes a sum of payloads of the at least one mobile device from among the acquired configuration combinations, and an operation of re-configuring the uplink transmission information for the at least one mobile device on the basis of the selected optimal configuration combination.

Various embodiments of the disclosure disclosed in the specification and drawings only present a specific example to easily describe the disclosure and help understanding of the disclosure but do not limit the scope of the disclosure. Therefore, the scope of the disclosure should be construed such that all modifications derived from the technical idea of the disclosure or modified forms are included in the scope of the disclosure as well as the embodiments disclosed herein.

The invention claimed is:

1. An electronic device comprising:
   a communication circuit for wireless communication with at least one mobile device and at least one adjacent basic service set (BSS); and
   a processor operatively connected to the communication circuit,
   wherein the processor is configured to:
     select a mobile device to perform uplink transmission from among the at least one mobile device,
     determine an allowable interference level based on uplink transmission information to be used for uplink transmission by the mobile device connected to the electronic device, determine whether the interference level is allowed by the adjacent BSS, transmit a first trigger frame including a first configuration based on the interference level to the mobile device and the adjacent BSS through the communication circuit when the adjacent BSS allows the interference level, re-determine the uplink transmission information to be used for the uplink transmission by the mobile device in consideration of allowance of the interference level by the adjacent BSS when the adjacent BSS does not allow the interference level, and transmit a second trigger frame including a second configuration based on the interference level and the re-determined uplink transmission information to the mobile device and the adjacent BSS through the communication circuit.

2. The electronic device of claim 1, wherein the processor is further configured to:

select the mobile device to perform uplink transmission within a BSS of the electronic device, determine the uplink transmission information to be used for uplink transmission by the mobile device, and estimate the interference level by which frame reception is not influenced based on at least the uplink transmission information.

3. The electronic device of claim 2, wherein the uplink transmission information includes at least one piece of information on uplink transmission such as frequency resources configured in the mobile device, a modulation and coding scheme (MCS), a number of spatial streams, or a target received signal strength indicator (RSSI).

4. The electronic device of claim 1, wherein the processor is further configured to:

determine whether interference with the adjacent BSS is allowable, based on the uplink transmission information to be used for uplink transmission by the mobile device, configure power backoff; based on the interference level in the first trigger frame when the interference is allowable, and perform a scheduling process for making the interference allowable through a re-configuration of the uplink transmission information when the interference is not allowable.

5. The electronic device of claim 4, wherein the processor is further configured to configure the power backoff such that interference generated by spatial reuse of the adjacent BSS is included within the interference level, and wherein the power backoff is configured in a spatial reuse field of the trigger frame.

6. The electronic device of claim 4, wherein the processor is further configured to:

estimate signal to interference plus noise ratio (SINR) degradation which should be accepted to allow interference, based on the interference level, acquire configuration combinations of uplink transmission information which is not influenced by the estimated SINR degradation, select an optimal configuration combination which maximizes a sum of payloads of the mobile device from among the acquired configuration combinations, and re-configure the uplink transmission information for the mobile device, based on the selected optimal configuration combination.

7. The electronic device of claim 6, wherein the processor is further configured to:

identify whether the acquired configuration combinations can accept the estimated SINR degradation through comparison with SINR degradation from a target RSSI and a signal strength required by the acquired configuration combinations, and select the optimal configuration combination, based on a result of the identification.

8. The electronic device of claim 6, wherein, when selecting the optimal configuration combination, the processor is further configured to:

configure a target RSSI in consideration of uplink transmission power headroom information of the mobile device, and configure the maximum number of spatial streams by a smaller value between the maximum numbers of spatial streams which the mobile device and the electronic device can support, and wherein an MCS or a resource unit size is selectively excluded from the configuration combinations.

9. The electronic device of claim 1, wherein the electronic device includes a device serving as a base station for at least one other electronic device located within a communication radius configured in a wireless local area network (WLAN) system.

10. A method of operating an electronic device, the method comprising:

selecting a mobile device to perform uplink transmission from among at least one mobile device;

determining an allowable interference level;

based on uplink transmission information to be used for uplink transmission by the mobile device connected to the electronic device, determining whether the interference level is allowed by an adjacent basic service set (BSS);

transmitting a first trigger frame including a first configuration based on the interference level to the mobile device and the adjacent BSS through a communication circuit when the adjacent BSS allows the interference level;

re-determining the uplink transmission information to be used for the uplink transmission by the mobile device in consideration of allowance of the interference level by the adjacent BSS when the adjacent BSS does not allow the interference level; and transmitting a second trigger frame including a second configuration based on the interference level and the re-determined uplink transmission information to the mobile device and the adjacent BSS through the communication circuit.

11. The method of claim 10, wherein the determining of the interference level comprises:

selecting the mobile device to perform uplink transmission within a BSS of the electronic device;

determining the uplink transmission information to be used for uplink transmission by the mobile device; and estimating the interference level by which frame reception is not influenced, based on at least the uplink transmission information.

12. The method of claim 10, wherein the transmitting of the trigger frame comprises:

determining whether interference with the adjacent BSS is allowable, based on the uplink transmission information to be used for uplink transmission by the mobile device;

configuring power backoff, based on the interference level in the first trigger frame when the interference is allowable; and performing a scheduling process for making the interference allowable through a re-configuration of the uplink transmission information when the interference is not allowable.

13. The method of claim 12, wherein the performing of the scheduling process comprises configuring the power backoff such that interference generated by spatial reuse of the adjacent BSS is included within the interference level, and wherein the power backoff is configured in a spatial reuse field of the trigger frame.

14. The method of claim 12, wherein the performing of the scheduling process comprises:

estimating signal to interference plus noise ratio (SINR) degradation which should be accepted to allow interference, based on the interference level;

acquiring configuration combinations of uplink transmission information which is not influenced by the estimated SINR degradation;

selecting an optimal configuration combination which makes a sum of payload of the mobile device maximum from among the acquired configuration combinations; and re-configuring the uplink transmission information for the mobile device, based on the selected optimal configuration combination.

* * * * *